Oct. 2, 1951  R. THORENS ET AL  2,570,040
TALKING MACHINE WITH RECORD CHANGER
Filed Jan. 7, 1946  8 Sheets-Sheet 1

Inventors
R. Thorens
L. Thévenaz

Oct. 2, 1951  R. THORENS ET AL  2,570,040
TALKING MACHINE WITH RECORD CHANGER
Filed Jan. 7, 1946  8 Sheets-Sheet 2
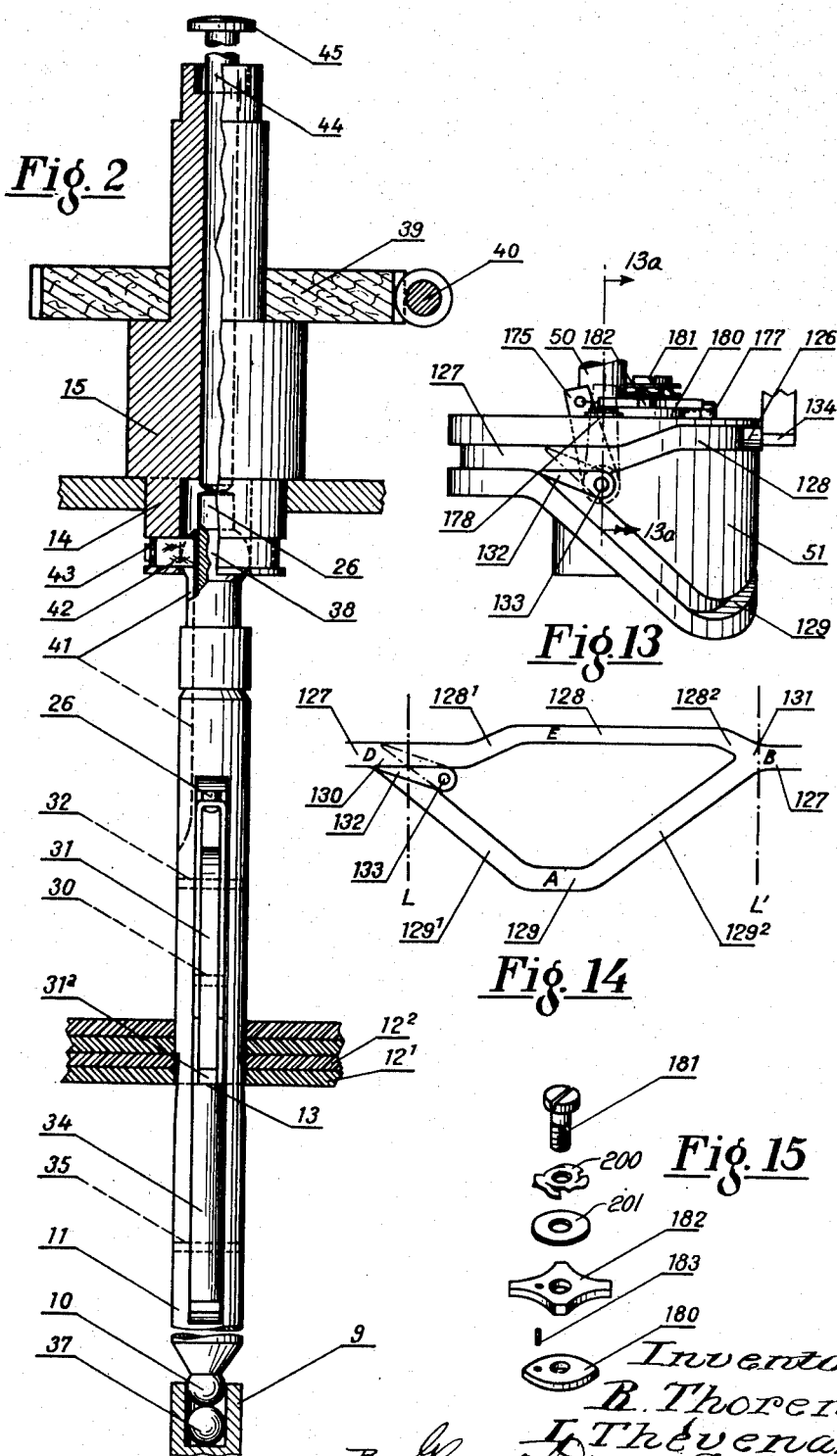

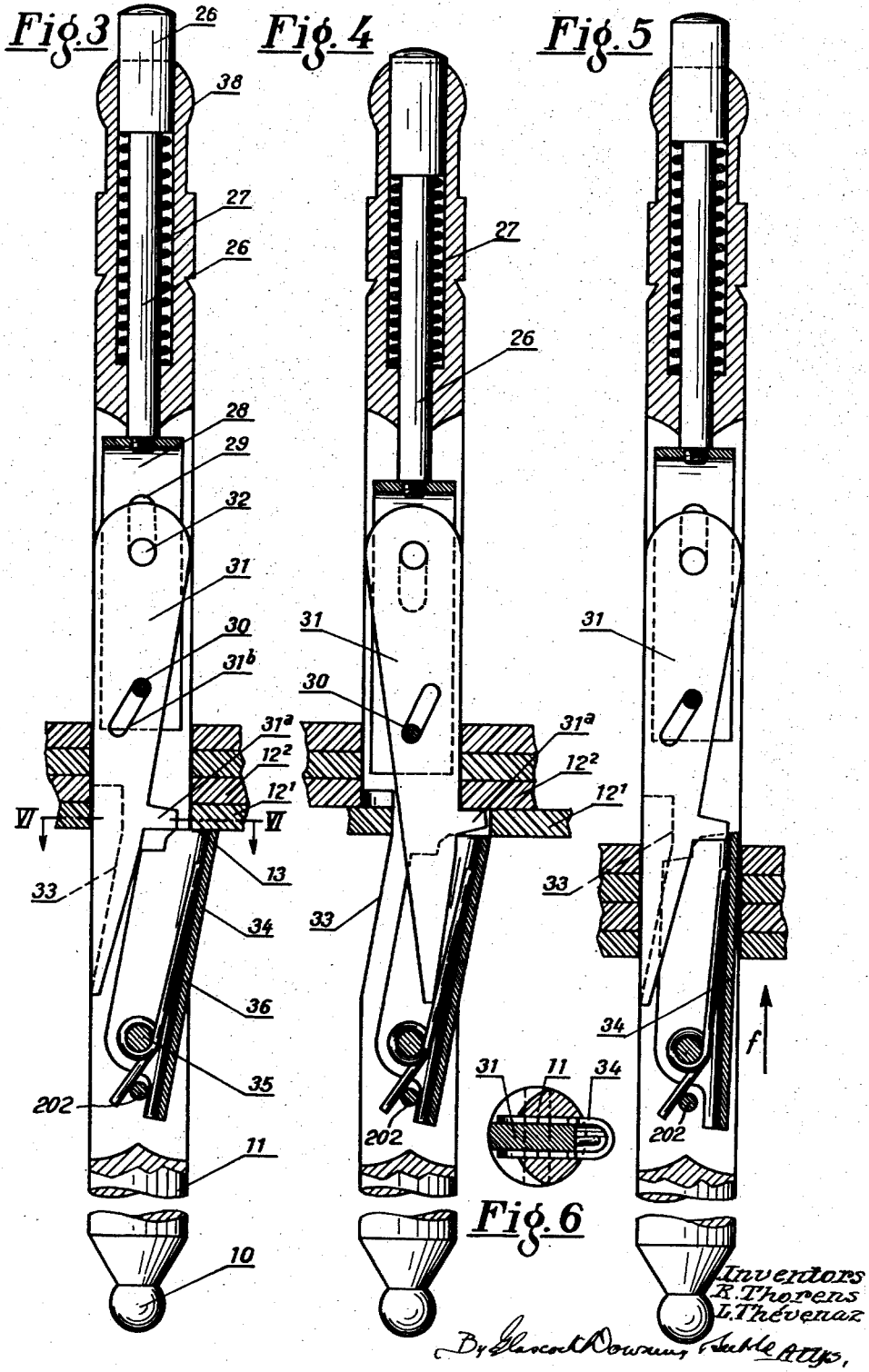

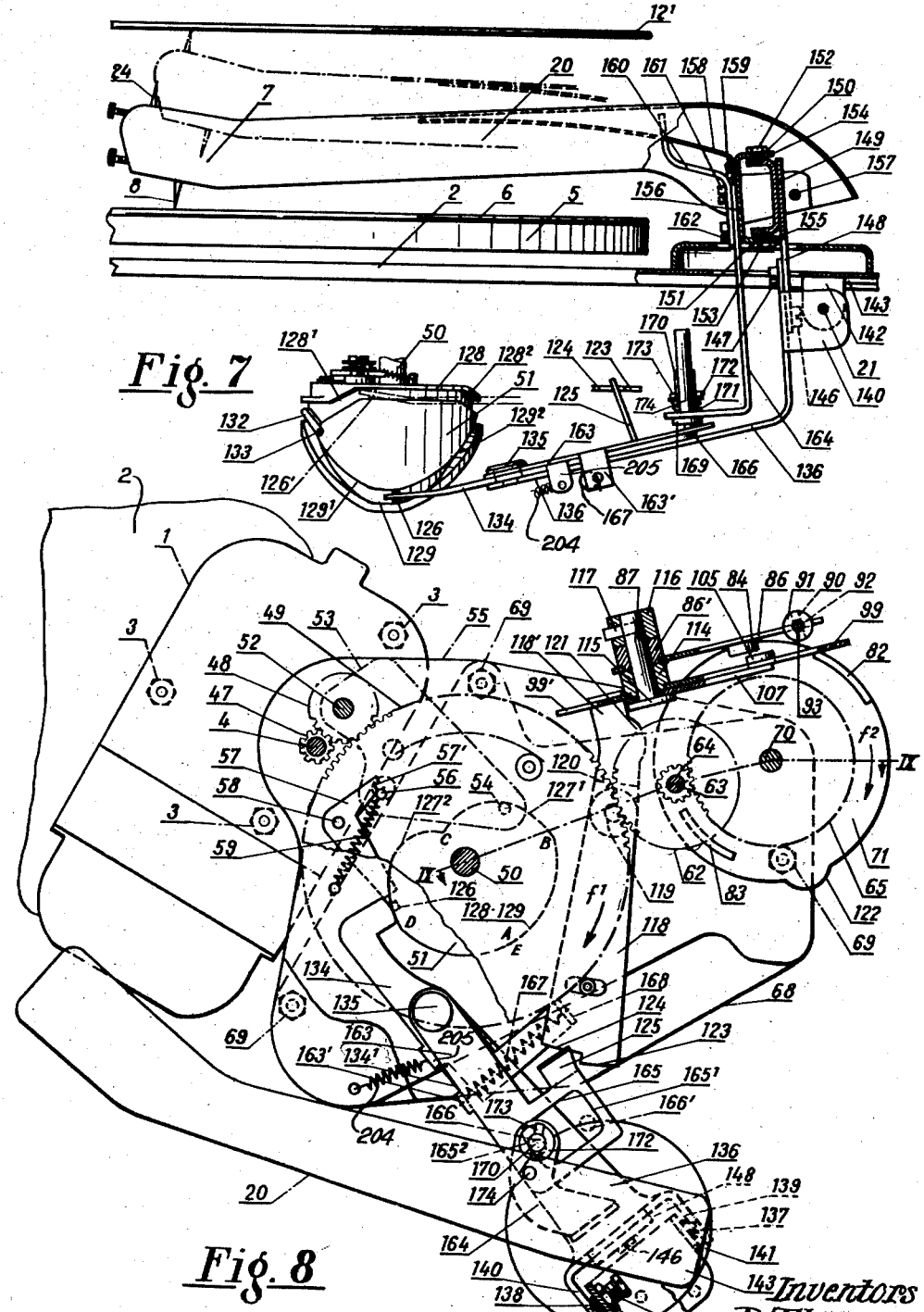

Inventors
R. Thorens
L. Thevenaz

Oct. 2, 1951 R. THORENS ET AL 2,570,040
TALKING MACHINE WITH RECORD CHANGER
Filed Jan. 7, 1946 8 Sheets-Sheet 7

Inventors
R. Thorens
L. Thevenaz
By Glascock Downing Fichtl
Attys

Oct. 2, 1951 R. THORENS ET AL 2,570,040
TALKING MACHINE WITH RECORD CHANGER
Filed Jan. 7, 1946 8 Sheets-Sheet 8
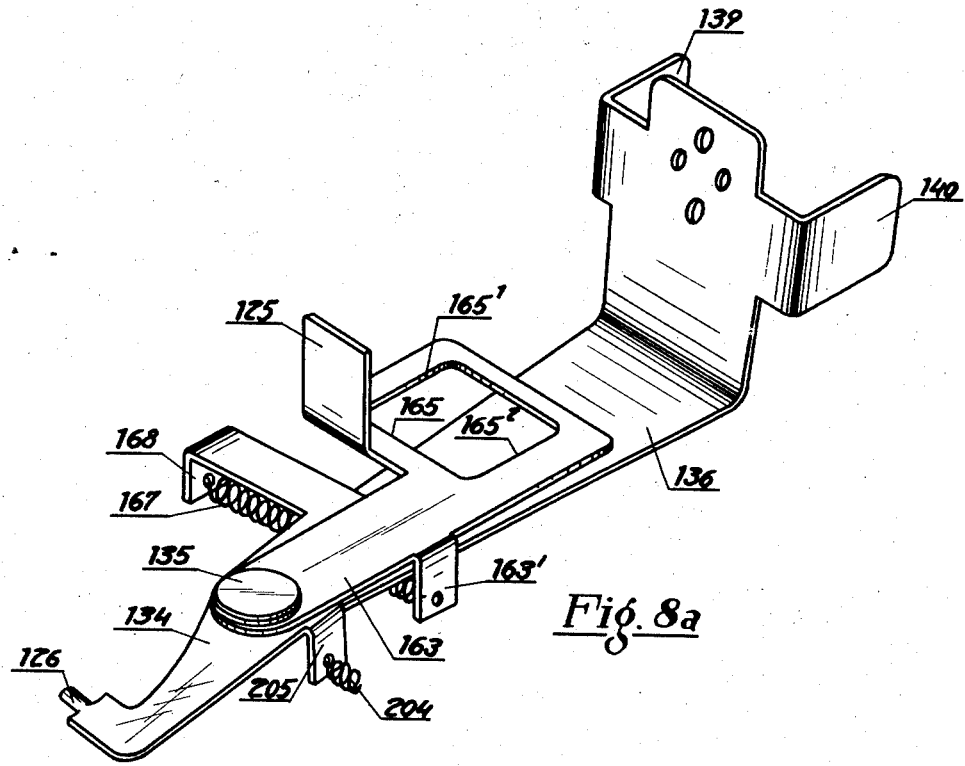
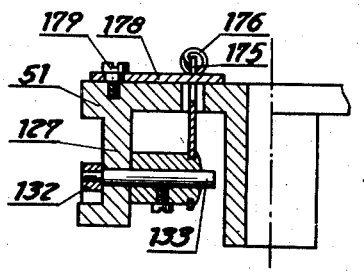
INVENTORS
R. THORENS AND
L. THÉVENAZ
BY
ATTYS.

Patented Oct. 2, 1951

2,570,040

UNITED STATES PATENT OFFICE 2,570,040

TALKING MACHINE WITH RECORD CHANGER

Robert Thorens, Sainte-Croix, and Louis Thévenaz, Les Rasses, near Sainte-Croix, Switzerland, assignors to Hermann Thorens Societe Anonyme, Sainte-Croix, Switzerland, a firm of Switzerland Application January 7, 1946, Serial No. 639,496
In Switzerland April 4, 1945

11 Claims. (Cl. 274—10)

The present invention relates to talking machines adapted to play automatically and successively both sides of a plurality of records, and more particularly to the talking machines of this type which are adapted to play alternately and practically without interruption the upper face of a record resting on the turntable and the lower face of the lowermost record of a reserve stack supported over the said turntable on the supporting surface of a central shaft passing through the central aperture of the reserve records.

One of the objects of the invention is to provide a record changing device which is simple, robust and reliable in operation, without excessive mechanical strains, and adapted to play indifferently various sized records such as standard 25 cm. and 30 cm. records in any order whatever and without turning them over.

Another object of the invention is to provide a sound reproducing device and a control mechanism for the movements of this device which permit to play indifferently in any order whatever, successively or alternatively, the upper side of a record resting on the turntable and/or the lower side of the lowermost record of a reserve stack whatever the size of the record to be played may be.

A further object of the invention is to provide a control mechanism for the tone arm and for the record changing device permitting to repeat at will one record side which has just been played.

A further object of the invention is to provide a control mechanism for the various movements of the tone arm which comprises a single rotary cam member, whereby the mechanism is simplified and the encumbrance thereof diminished.

A still further object of the invention is to provide a single mechanism for detecting the size of the records of different diameters, which mechanism is controlled by the revolving lowermost record of the reserve stack, independently from the absolute level of the edge of said record, whereby the defects in size detection due to the vertical oscillations of the reserve records or to the unroundness of the records in general may be removed.

Other objects and advantages of the invention will appear as the following description of a preferred embodiment thereof proceeds.

The accompanying drawings illustrate this embodiment by way of example.

In the drawings:

Fig. 2 is an enlarged view partly in elevation and partly in section of the records supporting central shaft and other elements connected therewith.

Figs. 3, 4 and 5 are axial sections on enlarged scale of the records-supporting shaft taken in three different working positions.

Fig. 6 is a radial section on the line VI—VI of Fig. 3.

Fig. 7 is a detailed elevation with parts in section of the pick-up control mechanism.

Fig. 8 is a general plan view of the control mechanisms for the pick-up and the record feeding device.

Fig. 8a is a perspective view of a part of the tone arm control mechanism.

Fig. 13 is an elevation of the control cam for the movements of the tone arm.

Fig. 13a is a section of a detail taken on line 13a—13a in Fig. 13.

Fig. 14 is a diagrammatic representation of the cam paths of the cam shown in Fig. 13.

Fig. 15 is a perspective view showing the construction of a detail of the cam of Fig. 13.

Figure 1:
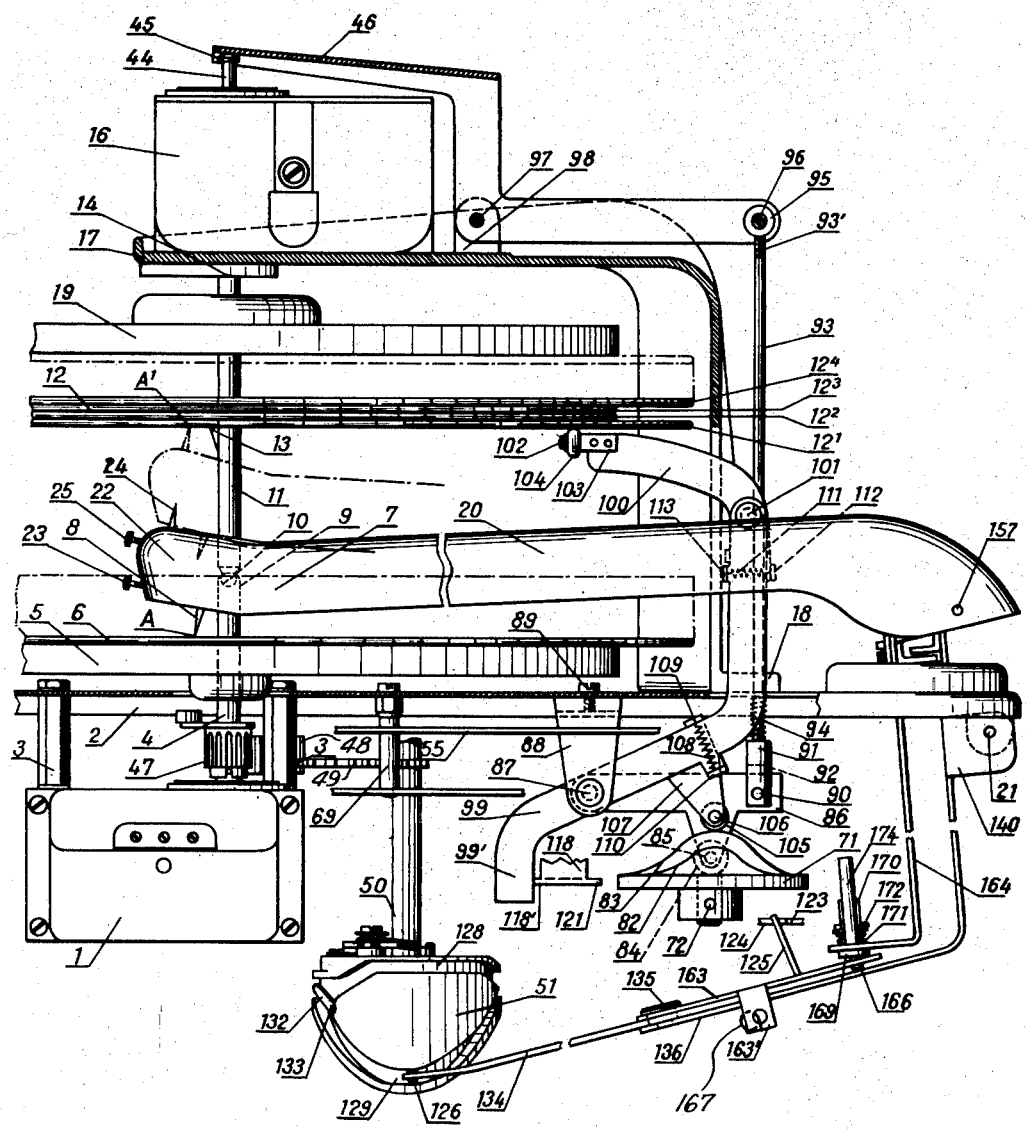
Fig. 1 is a general view partly in elevation and partly in section of the talking machine, without the frame and the cabinet in which only the members necessary to the understanding of the invention are shown and certain parts are broken away.
Figure 9:
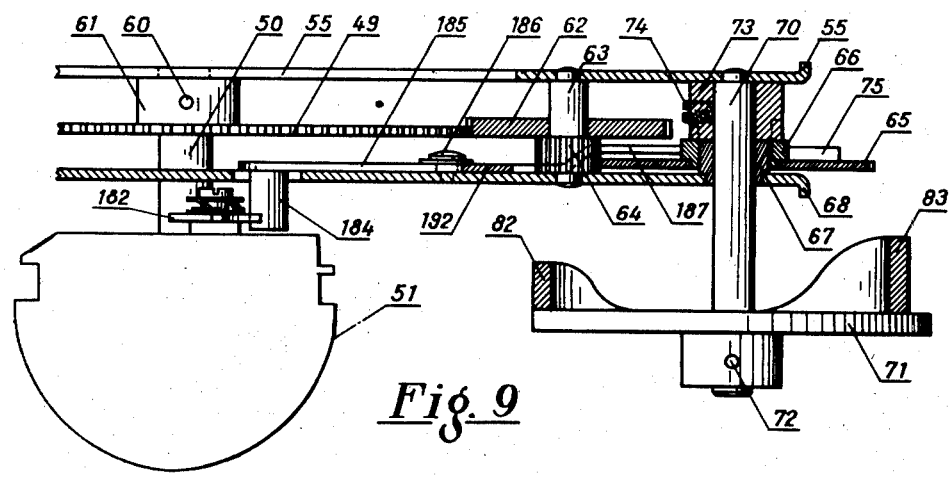
Fig. 9 is a vertical section on the line IX—IX of Fig. 8.

The automatic phonograph represented in the drawing comprises a first electric motor 1 fixed on the lower face of the base plate 2 by means of three bolts 3. The shaft 4 driven by this first motor drives the turntable 5 on which is supported a record 6, the upper side of which is to be played by the lower needle 8 of the pick-up 7. The upper extremity of the shaft 4 is centrally bored and constitutes a socket 9 in which is removably supported the semi-spherical lower end 10 of a straight shaft 11 passing through the central aperture of the records 12 of a reserve stack; the lowermost record 12¹ of the stack is supported by the supporting surface 13 of a movable U-shaped piece 34 (Figs. 2, 3, 4, 5 and 6) hinged to the shaft 11 about a pin 35 in a longitudinal groove thereof.

The semi-spherical upper end of the shaft 11 is removably supported by a socket 14 carried by the shaft 15 driven by a second electric motor 16 positioned above the reserve stack of records 12 on a bracket 17 fastened on the base plate 2 by means of screwed bases 18. On the reserve stack rests a presser plate 19 engaged on the shaft 11 adapted to hold the records 12 in place in order to prevent them from oscillating during their rotation. The upper motor 16 drives the removable shaft 11 which is made dependent on the shaft 15, in the opposite direction to the turntable 5 so that the records 12 and 6 are moved in opposite directions.

The sound-reproducing device adapted to play successively the upper side of the record 6 resting on the turntable 5 and the lower side of the lowermost record 12¹ of the reserve stack supported on the supporting surface 13 of the shaft 11, comprises a single tone arm 20, pivoted about a horizontal shaft 21 is situated under the surface of the turntable 5. This single tone arm is provided with two sound-reproducing heads assembled together in a single box 22 and comprising the one a downward directed needle 8 fastened in its oscillating armature by the screw 23, and the other an upward directed needle 24 fastened in its oscillating armature by the screw 25. Both the sound-reproducing heads are placed in a common magnetic field, which means that the pick-up 7 comprises a single magnet for both the armatures. The needles 8 and 24 are inclined with respect to the vertical, needle 8 towards the left, and needle 24 towards the right. They are arranged so that in the lower playing position of the pick-up shown in full lines, the extremity of the lower needle 8 is positioned at a point A situated on the same axis at least approximately vertical than the point A¹ where is positioned the extremity of the upper needle 24 in the upper playing position shown in dotted lines. As the horizontal rotation shaft 21 of the tone arm 20 is not situated at equal distance from the lower and upper playing surfaces but under the lower playing surface, the needle 8 is displaced for a small distance towards the shaft 21 with respect to the upper needle 24.

Record feeding mechanism

The removable shaft 11 which drives under the action of the upper motor 16 the reserve records 12 in opposite direction to the turntable 5, is hollow, and in the inside thereof is slidingly mounted a rod 26 (Figs. 2-5) submitted to the pressure of a coil spring 27 which tends to push it upward; at the lower end of the rod 26 is fixed a fork 28 having a longitudinal slot 29 and a cross pin 30. With the fork 28 is hingedly connected a piece 31 pivoted at its upper end about a cross pin 32 engaging the slot 29 of the fork 28 and riveted to the shaft 11; the piece 31 presents in its middle portion a biased slot 31ᵇ in which is engaged the pin 30 of the fork 28. The piece 31 is thus hingedly connected with the fork 28 like a scissors blade so that a downward displacement of the axial rod 26 against the action of the spring 27 will cause the nose 31ᵃ of the piece 31 to emerge from the hollow shaft 11. This nose 31ᵃ has a thickness almost equal to the thickness of the thinnest standard record and constitutes a push-member adapted to move laterally the lowermost record 12¹ of the reserve stack in order to release it from the supporting surface 13 and cause it to drop down by gravity along the shaft 11 onto the turntable 5 when, under the action of the feeding control mechanism which will be hereinafter described, the axial rod 26 is moved downward. The nose 31ᵃ holds at the same time the last record but one 12² and the whole stack resting on it, while the record 12¹ drops along the shaft 11, the edge of the central aperture of said record opposite to that which is pushed by the nose 31ᵃ entering a notch 33 provided on the shaft 11. Fig. 3 shows the shaft 11 in the position occupied by its members during the playing of a record and Fig. 4 shows it in the feeding position of the record 12¹ onto the turntable.

The record supporting surface 13 is formed by the upper surface of a U-shaped piece 34 hinged to a pin 35 diametrically crossing the hollow shaft 11. The piece 34 is submitted to the action of a restoring spring 36 bearing on a stop pin 202 and tending to hold it in the position shown in the Figs. 3 and 4. The supporting surface 13 is thus collapsible into the inside of the shaft 11 under the action of one or more records moving upward as indicated by the arrow f on Fig. 5. It is thus possible at any time, except, of course, at the time of feeding, to move again one or more records from the turntable upward into the reserve position, which means to reload the machine without taking apart the shaft 11 and without waiting for all of the records of the stack to be played. During the reloading operation of one or more records, the notch 33 of the shaft 11 is obstructed by the lower end of the piece 31 in order to prevent the records from being stopped during their upward movement by the shoulder formed by the upper edge of the notch 33.

The shaft 11 is supported by its semi-spherical lower end 10 on the ball thrust bearing 37 in the socket 9 and is engaged by its upper semi-spherical end 38 in the upper socket 14 formed by the lower extremity of the shaft 15 driven by the upper motor 16. This shaft 15 rotates at a speed of 78 revolutions per minute, like the shaft of the lower motor 1 but in opposite direction. It is driven by a worm wheel 39 made of soundproof material and meshing with a worm gear 40 formed integral with the end of the armature shaft of the motor 16. The upper end of the shaft 11 presents a longitudinal groove 41 in which penetrates a blade 42 riveted to a semicircular spring 43 engaged in a circular outer groove of the socket 14. The shaft 11 is thus rotatively driven by the spring-urged blade 42, 43, which is dependent on the socket 14 of the shaft 15. Together with the shaft 11, the presser plate 19 is also driven. The lower end of the groove 41 serves as a stop for the presser plate 19 when the stack of records is out.

The shaft 15 is centrally bored and in its bore is slidingly mounted a plunger 44 the upper extremity of which emerges from the shaft 15 and is provided with a head 45 on which acts a lever 46 of the feeding control mechanism which will be hereinafter described.

In order to reload the changer the shaft 11 together with the presser plate 19 is removed by lifting it vertically until its lower semi-spherical end 10 is disengaged from the socket 9 of the lower shaft 4, then inclining and lowering it in order to disengage its upper semi-spherical end 38 from the socket 14 of the shaft 15. The 25 cm. and 30 cm. records, mixed in any desired order are then placed on the turntable 5 by engaging them on the extremity of the shaft 4 as for a usual phonograph without record-changer. The shaft 11 with the presser plate on it, is then introduced again into the sockets 9 and 14. The stack of records resting on the turntable is then raised manually along the shaft 11: the supporting surface 13 collapses at the passage of the records and is then restored into its supporting position by the spring 36.

When introducing the upper end 38 of the shaft 11 into the socket 14 of the shaft 15 if the driving blade 42, 43 does not face the groove 41, the spring 43 yields and permits the introduction of the shaft. It is then sufficient to rotate the shaft until the blade 42 enters the groove.

The control mechanism of the record feeding acts through the lever 46 and the plunger 45, 44 on the axial rod 26 which is slidingly mounted within the shaft 11; this control mechanism is shown in the Figs. 1, 8, 9, 10.

On the shaft 4 driven by the lower motor 1 is fixed a toothed pinion 47 with which a coupling pinion 48 is adapted to mesh; this coupling pinion 48 meshes constantly with a toothed gear 49 of large diameter secured to a shaft 50 on which is also fixed a cam 51 which constitutes the control member of the cycle of the tone arm. This cam 51 remains at rest during the playing of each record side but it is driven by the shaft 4 after one record side has been played until the beginning of the playing of the following record side. The coupling pinion 48 is loosely mounted on a stud 52 fixed on the lower face of a rocking lever 53 pivoted about a stud 54 fastened to the lower side of a plate 55. The rocking lever 53 carries further on its upper face a pin 56 adapted to co-operate with a stop surface 57' of a lever 57 pivoted about a stud 58 fastened to the plate 55, against the action of a restoring spring 59. The large diameter gear 49 is secured to the shaft 50 by means of a pin 60 set in a sleeve 61. The rocking lever 53 oscillates in such a way that its coupling pinion 48 meshes constantly with the gear 49 while being able to be put into gear with or out of gear of the pinion 47 according to the position of the lever 57. When the pinion 48 meshes with the pinion 47, the movement of the shaft 4 is transmitted at reduced speed by the gear 49 to the cam 51 which comprises all of the necessary members for controlling the movement of the tone arm. The position of the lever 57 which determines the coupling and decoupling of the unit gear 49 and cam 51 is controlled by a lever (not shown) dependent on the tone arm.

From the gear 49, the rotation is transferred to a toothed gear 62 fitted on the shaft 63 of a pinion 64. This pinion meshes with a toothed gear 65 staked on a sleeve 66 loosely mounted on a sleeve 67 fixed in a plate 68. The plates 55 and 68 which constitute the frame of the whole mechanism are fixed together to the main base plate 2 by means of three bolts 69. The gear ratio is chosen so that the gear 65 makes one half of a revolution while the large diameter gear 49 and thus the cam 51 makes one complete revolution.

In the fixed sleeve 67 is pivoted a shaft 70 to the lower extremity of which is secured a second cam 71 which constitutes at the same time the control member of the record feeding and the control member of the selection of different sized records. The cam 71 is secured to the shaft 70 by means of a pin 72. On the upper end of the shaft 70 is mounted a coupling sleeve 73 made dependent in rotation on the shaft 70 by a screw 74. The coupling sleeve 73 may also be made dependent in rotation on the sleeve 66 of the gear 65 through the medium of a semi-circular coupling lever 75.

Figure 10:
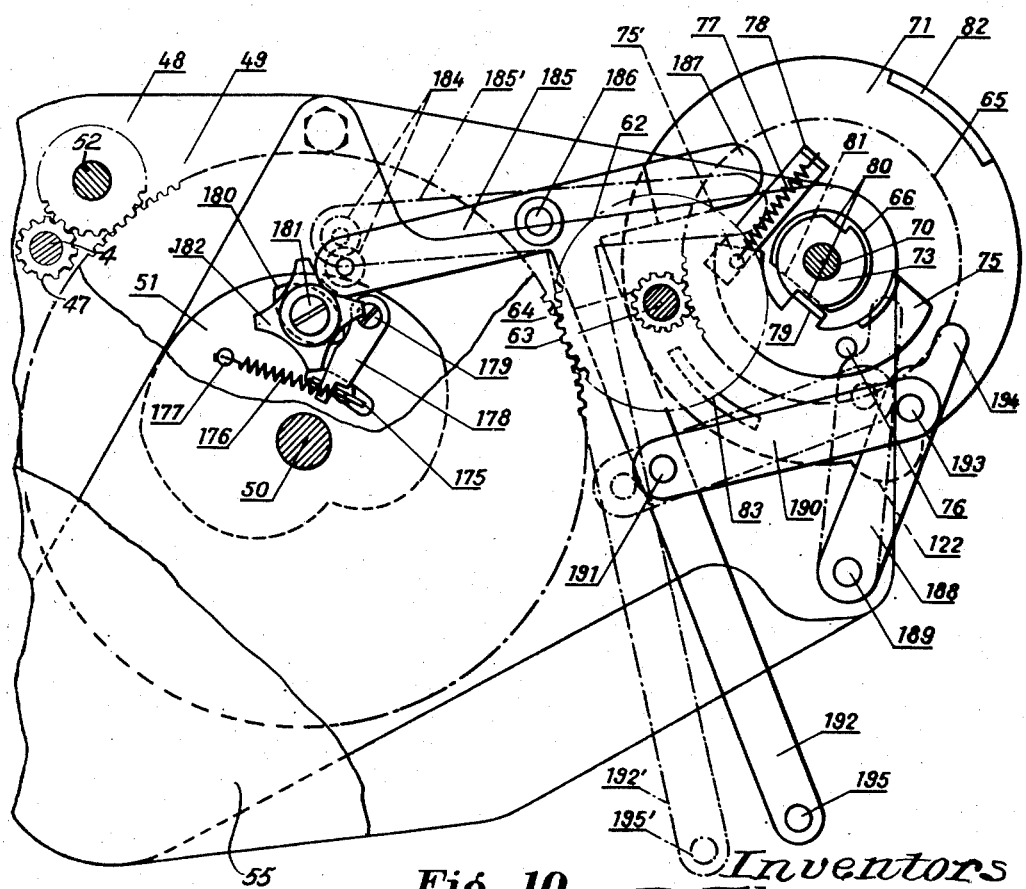
Fig. 10 is a plan view of the size detecting mechanism with the repeating device in which only the members necessary to the understanding of the invention are shown and certain parts are broken away.

The coupling lever 75 is pivoted at 76 on the gear 65 (Fig. 10). A spring 77, fastened at one end to an ear 78 of the gear 65 puts a traction on the extremity 75' of the lever 75, a bent lug 79 of which engages one of the diametrically opposite notches 80 of the sleeve 73, thus transferring the motion to the cam 71. The sleeve 66 has an aperture 81 for the passage of the lug 79 of the lever 75.

The cam 71 is provided with two diametrically opposite rolling paths of different diameters. The rolling path 82 constitutes the control cam of the record feeding and the rolling path 83 constitutes the control cam of the different sized records selection.

The cam path 82 co-operates with a roller 84 pivoted at 85 on a lever 86. This lever 86 is pivoted through the medium of a sleeve 86' fixed at its end, about a shaft 87 dependent on a corner plate 88 fastened by a screw 89 to the main base plate 2 of the machine. On the lever 86 is pivoted by means of a pin 90 a sleeve 91 slit at 92. In the screw-tapped end of the sleeve 91 is screwed the end of a rod 93. A coil spring 94 bearing on the lower face of the base plate 2 acts on the sleeve 91 and tends to push the latter together with the rod 93 downwardly. The rod 93 passes through the base plate 2 and its screw-threaded upper end 93' is screwed in a tapped sleeve 95 pivoted about a stud 96 fastened to the outer end of a bell crank lever 46 pivoted about a pin 97 carried by an ear 98 of the bracket 17 on which is fixed the upper motor 16.

When, at the end of the playing of the lower side of the reserve record 12¹, the upper needle 24 enters the eccentric terminal groove of this record, the sudden impulse given to the tone arm actuates the automatic stopping device and causes the toothed gear 49 to engage through the reversing pinion 48 the pinion 47 of the shaft 4. The rotation of the gear 49 is transmitted, as above described, to the cam 71 which begins to rotate. The roller 84 following the path 82 lifts the lever 86 and the rod 93 thus causing the lever 46 to pivot about 97 and the inner extremity thereof to actuate the head 45 of the plunger 44; this plunger passes through the hollow shaft 15 of the upper motor and actuates the upper extremity of the rod 26 which is moved downward and causes the piece 31 to pivot within the hollow shaft 11 and to displace laterally by means of the nose 31ᵃ the lowermost record 12' of the stack, the lower side of which has just been played.

It is to be pointed out that the cam 71 makes one half of a revolution while the cam 51 which controls the movements of the pick-up and is dependent upon the gear 49 makes one full revolution, with the result that the record feeding device accomplishes its function one time for each two revolutions of the cam 51, that is after both sides of a record have been played.

*Mechanism for playing different sized records*

This mechanism comprises a first lever 99 pivoted about the same shaft 87, dependent on the corner plate 88, about which is pivoted the lever 86 of the record feeding mechanism, and a second lever 100 pivoted about a pin 101 at the upper end of the first lever 99. At the free extremity of this second lever 100 is rotatably mounted on a pin 102 welded to a flattened part 103 thereof, a roller 104.

The first lever is controlled by the path 83 of the cam 71 on which is guided a roller 105 pivoted about a shaft 106 carried by the extremity of a bell crank 107 pivoted itself about the shaft 87 and resiliently connected with the lever 99 by a coil spring 108: this spring 108 is attached at the one side to an ear 109 of the bell crank 107 and at the other to an ear 110 of the lever 99. This resilient connection through the spring 108 between lever 99 and bell crank 107 permits the lever 99 to perform a variable stroke according as the roller 104 runs or not against the edge of a 25 cm. record, while the bell crank 107 performs an invariable stroke under the action of the cam path 83 of cam 71. The levers 99 and 100 are also resiliently connected with each other through a second coil spring 111 attached at the one side to an ear 112 of lever 100 and at the other to an ear 113 of lever 99. This second spring has for its function to maintain the roller 104 in contact with the lowermost record 12¹ of the reserve stack, even if this record oscillates while rotating.

The whole device comprising the levers 99 and 100 and the springs 108 and 111 is arranged so that if the record 12¹ is a 30 cm. record (Fig. 11), the roller 104 rolls, in working position of the device, on the lower face of the record, at a distance X from the axis of the records less than 25 cm., and if this record is a 25 cm. one (Fig. 12) the said roller 104 runs against the edge of said record, that is, at a distance X+x from the axis of the records; in the latter case the springs 108 and 111 tend to bring the roler 104 during the inward motion of the lever 100 under the action of the cam path 83 to a higher level than the lower face of the record 12¹.

Figure 11:
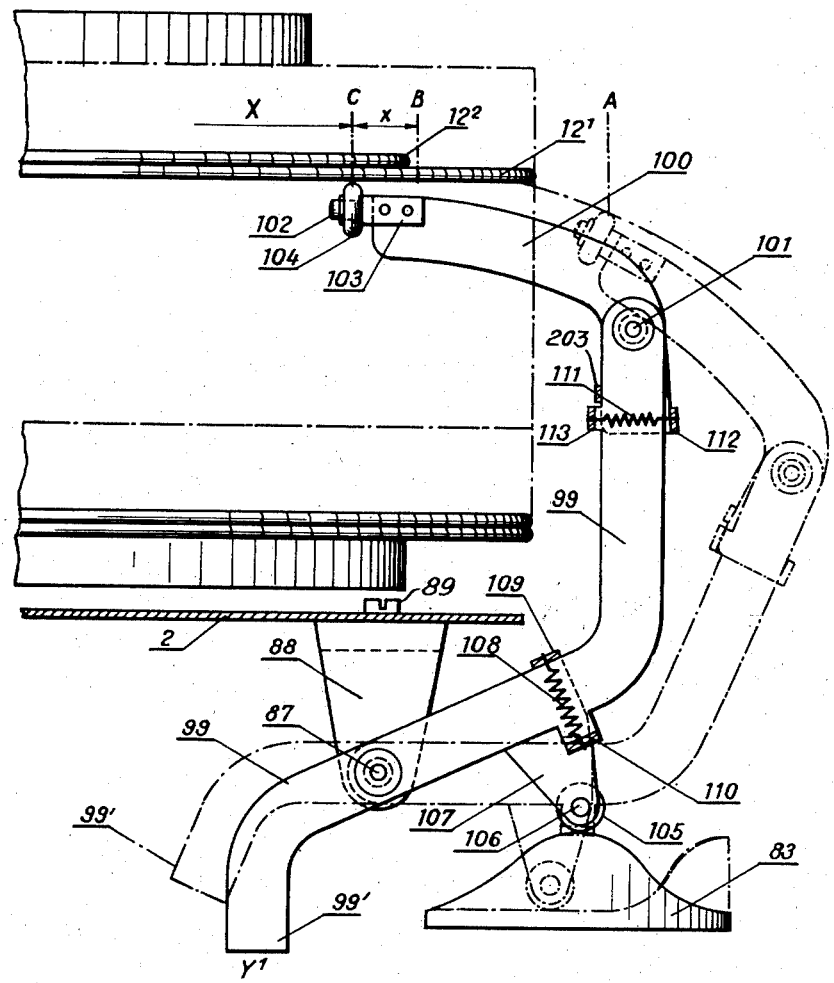
Figs. 11 and 12 are elevations of the size detecting mechanism taken in two different working positions.
Figure 12:
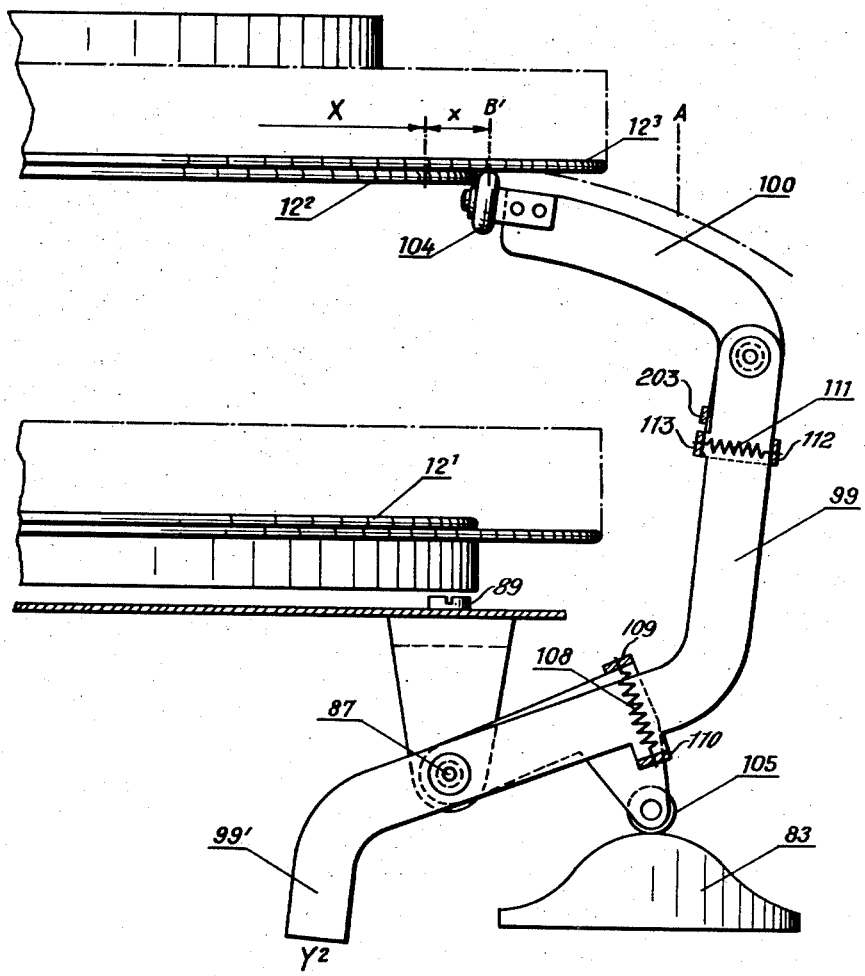

At the beginning of the cycle, the size detecting device occupies the position indicated in dotted lines in Fig. 11, in which position the roller 104 is situated beyond the periphery of the largest record of the reserve stack; in this position it does not hinder the feed of the records to the turntable. Under the action of the cam path 83, the bell crank 107 carrying the roller 105 turns on the shaft 87 and drives through the spring 108 the lever 99 in a counter-clockwise direction. If the record 12¹ is a 30 cm. record, the roller 104 performs a travel A—B—C in order to come to roll on the lower face of this record 12¹ (Fig. 11) at the distance X from the axis of the records. The lower extremity 99' of the lever 99 comes to occupy the position Y¹.

If however the record 12¹ is a 25 cm. record (Fig. 12) the roller 104 comes to prop against the edge of this record thus performing a travel A—B' equal to A—B. The lower extremity 99' of the lever 99 comes to occupy a position Y². The difference between the positions Y¹ (Fig. 11) and Y² (Fig. 12) of the lower extremity 99' of the lever 99 permits as it will be hereinafter described, to determine the initial playing position of the pick-up so that the upper needle thereof always enters the outer groove of the record 12¹ whether this record is a 30 cm. or a 25 cm. one.

The Fig. 8 shows in section the pivoting of the lever 99 about the shaft 87. The lever 99 is staked on a sleeve 114 pivoted about the shaft 87 on which are also pivoted the sleeve 86' of the record feeding bell crank 86 and the lever 107. The whole is axially held in place between a shoulder 115 formed at the one extremity of the shaft 87 and another shoulder 116 formed on the corner plate 88 to which the other extremity of the shaft 86 is fixed by a pin 117.

The extremity 99' of the lever 99 is placed on the way of the extremity 118' of a lever 118 pivoted at 119 on the lower plate 68; this lever extremity is bent at 120 and provided with a projection 121 placed on the way of a projection 122 on the periphery of the cam 71. At its opposite extremity, the lever 118 has two stair-like contact surfaces; namely the surface 123 which is the more distant and the surface 124 which is the less distant from the pivoting pin 119. These surfaces are adapted to co-operate, according to the position of the lever 118, with an arm 125 dependent upon the mechanism controlling the movements of the tone arm. The extremity 118' of the lever 118 may be brought into three different positions: (a) Under the action of the peripheric projection 122 of the cam 71 on the projection 121, it is moved to the extreme left position; (b) If the roller 104 runs against the edge of a 25 cm. record (Fig. 12) the extremity 99' of the lever 99 being in the position Y² moves the extremity 118' of the lever 118 into its middle position shown in Fig. 8. The arm 125 is then positioned in front of the contact step 124 of the lever 118; (c) If the roller 104 rolls on the lower face of a 30 cm. record (Fig. 11), the extremity 99' of the lever 99 being in the position Y¹ moves the extremity 118' of the lever 118 into its extreme right position in which the arm 125 co-operates with the contact step 123.

*Tone arm control mechanism*

The single tone arm 20 carrying the lower needle 8 adapted to play the records resting on the turntable 5 and the upper needle 24 adapted to play the lower face of the reserve records is controlled by means of a single cam 51 which determines all of the movements thereof owing to two distinct cam paths with which co-operates at will a guiding pin 126 carried by a member dependent upon the tone arm. The cam 51 secured to the vertical shaft 50 comprises on a portion of its periphery a single cam path 127 adapted to control the inward and outward movements of the pick-up before and after the playing of each record side. On an other portion of its periphery, between the radii L and L' (Fig. 14) the cam 51 has two cam paths 128 and 129 diverging at 130 from the cam path 127 and converging to the latter at 131. The guiding pin 126 follows from the point 130 to the point 131 either the path 128 or the path 129 when the cam 51 rotates in the direction of the arrow f¹, in order to control the upward and downward movements of the pick-up. At 130 a switch 132 pivoted about a shaft 133 permits to turn off the pin 126 into one or the other path 128, 129. The control mechanism of this switch 132 will be hereinafter described. Both the paths 128 and 129 are situated on a common cylindrical surface, the axis of which is at 50. The path 128 comprises a rising ramp 128¹ followed by a descending ramp 128²; inversely the path 129 comprises first a descending ramp 129¹ followed by a rising ramp 129².

The guiding pin 126 which follows the grooved cam paths is fixed to the end of an arm 134 pivoted about a stud 135 riveted on the extremity of a second arm 136 adapted to turn about the horizontal shaft 21 constituted by the opposite points of two cones 137, 138 engaged in the ears 139, 140 of the lever 136 and fixed in the ears 141, 142 of a bracket 143 welded on the base plate 2. The cone 138 is adjustable by means of a screw-threaded sleeve 144 and may be locked in position by a nut 145. At the upper end of the lever 136 is fixed by means of screws 146, 147 a piece 148 to which is welded a U-shaped piece 149 in the legs of which are bored conical holes in which are engeged the conical points 150, 151 of bolts 152, 153 screwed in ears 154, 155 of a bracket 156. The cones 150, 151 constitute the vertical axis of rotation of the tone arm with its support. The bracket 156 carries itself a horizontal pin 157 about which the tone arm 20 is pivoted for vertical movements so that the pick-up may freely follow the vertical oscillations of the records independently from the upward and downward movements imparted thereto by the cam 51 before and after the playing of each record side and that the pick-up may also be lifted and lowered manually from its upper and lower playing positions respectively without changing the position of its support, that is of the levers 136, 134 and of the guiding pin 126.

A spring leaf 158 fixed to the bracket 156 by a screw 159 serves to press the pick-up against the lower side of the reserve record 12¹ so as to give it the necessary pressure for playing this record side when the guiding pin 126 after having followed the cam path 128 thus rotating the levers 134 and 136 about the horizontal shaft 21 reaches to the top of the rising ramp 128¹ into the position 126′ shown in dotted lines in Fig. 7. In the position of the pin 126 shown in full lines in Fig. 7, that is at the foot of the descending ramp 129¹ of the cam path 129, it is the lower needle 8 of the pick-up which plays the upper side of the record 6 supported on the turntable 5: the spring leaf 158 does not put any pressure on the tone arm: but it is through this same spring leaf that the levers 134 and 136 lift the pick-up over the record 6 after its upper side has been played, as the pin 126 follows the rising ramp 129² of the cam path 129.

A stop 160 fixed by screws 161, 162 to the bracket 156 limitates the downward displacement of the tone arm about the horizontal pin 157.

The inward and outward displacements of the pick-up caused by the pin 126 following the path 127 of the cam 51 are transmitted to the tone arm support by the lever arm 134 pivoted about the vertical stud 135, through the medium of a link 163 pivoted too about 135 and of another lever 164 fixed by the screws 161, 162 to the bracket 156 (Figs. 7 and 8). When the pin 126 travels through the first portion 127¹ (Fig. 8) of the cam path 127, while the cam 51 rotates in the direction of the arrow f¹, the lever 134 is rotated about 135 in the clockwise direction. The edge 134¹ of this lever draws forth the link 163 by the ear 163¹ thereof. This link 163 is provided at its extremity opposite the stud 135 with a rectangular aperture 165, the edge 165¹ of which draws forth a pin 166 secured to the bell crank lever 164 fixed to the bracket 156 thus drawing the tone arm into rotation about the vertical axis 150—151 towards the outside of the turntable.

When the pin 126 follows the portion 127² of the cam path 127 it draws the lever 134 together with the link 163 in counter-clockwise direction; it is then the edge 165² of the aperture 165 which draws forth the pin 166 and rotates the tone arm through the medium of the lever 164 towards the inside of the turntable. The inward movement of the tone arm proceeds until the arm 125 dependent upon the link 163 comes in contact with one of the steps 123 or 124 on the lever 118 of the record size detecting device. If it runs against the step 123, the pick-up will be stopped over the outer groove of a 30 cm. record; if however the arm 125 runs against the step 124 of the lever 118, the pick-up will be stopped in its inward movement over the outer groove of a 25 cm. record.

A spring 167 attached at the one end to the ear 163′ and at the other end to an ear 168 of the lever 134 tends to maintain the edge 134¹ of this lever in contact with the ear 163′ of the link 163 and enables lever 134 to perform a larger rotation than link 163 when the arm 125 comes to run against one of the steps 123 or 124, which occurs before the pin 126 reaches its outermost position on the cam path 127.

The pin 166 is turned eccentrically on a collar 169 of a stud 170 mounted with hard friction in a hole of the arm 164. This hard friction is obtained by means of a spring 171 tensioned by a washer 172 and a cross pin 173. By rotating the stud 170 it is thus possible to adjust the stop position of the pick-up above or under the outer groove of the record side to be played. 174 (Fig. 8) indicates a pin set in the lever 164 which serves to actuate the automatic stopping mechanism, not shown. The control of the switch 132 of the cam 51 is performed through the medium of the following device (Figs. 10 and 13):

On the shaft 133 of the switch 132 is fixed a lever 175 submitted to the action of a restoring spring 176 attached to a stud 177 on the cam 51. This lever 175 bears against another lever 178 pivoted about 179. This latter lever 178 bears in its turn against a cam disc 180 pivoted about a screw 181 and made dependent by a pin 183 upon a four-armed star wheel 182. The Figure 15 illustrates the detail of the revolving unit 180—182. 200 and 201 indicate an elastic washer and a washer, respectively. At each revolution of the control cam 51, a pin 184 set in the extremity of a lever 185 pivoted about a pin 186 causes the star wheel to move one step thus rotating the cam disc 180 one fourth of a revolution. If thus the lever 178 occupies during one revolution of the cam 51 the position indicated in full lines in Fig. 10, during the following revolution, under the action of the cam disc 180 having moved the star wheel one fourth of a revolution, it will take another position and its displacement will promote a corresponding displacement of the lever 175 dependent upon the switch 132; the latter changes thus its position at each revolution of the cam 51 thus switching the pin 126 by turn onto either the cam path 128 or the path 129. If it is desired to repeat either the lower side of the record 12¹ or the upper face of the record 6, it will be sufficient to retract the pin 184 from the way of the star wheel 182 by rotating the lever 185 to bring it into the position 185′ shown in dotted lines in Fig. 10. The switch 132 will thus be maintained in its intitial position during the subsequent revolution of the cam 51 and the tone arm will repeat the movements of the half-cycle just accomplished until the pin 184 will be brought back onto the way of the star wheel 182.

The repeating lever 185 is T-shaped and pivoted about a stud 186 fixed to the upper face of the lower plate 68 of the mechanism. The extremity 187 of its cross arm opposite the pin 184 is situated in the position shown in full lines in Fig. 10, out of the way of the coupling lever 75.

A lever 188 pivoted about a pin 189 on the lower plate 68 is also controlled by the lever 185 through the medium of a link 190 pivoted about a pin 191 on the arm 192 of the lever 185 and about a pin 193 on the lever 188. This lever system is so arranged that when the extremity 187 of the lever 185 is out of the way of the coupling lever 75, the lever 188 has its extremity 194 also out of this way and when 187 is on this way, 194 is there too. The repeating lever 185 is controlled by a knob 195 placed at the extremity of its middle arm 192. When this knob is pushed into the position 195¹, the pin 184 is brought out of the way of the star wheel 182 while 187 and 194 are brought into the way of the coupling lever 75 thus stopping the cam 71.

The function of the various mechanisms will be now described:

(a) *Playing cycle without repetition*

1. The terminal eccentric groove of the upper side of the record 6 supported on the turntable 5 imparts to the lower needle 8 of the pick-up a sudden impulse which is transmitted by the tone arm 20 through the lever 164 and the pin 174 to an automatic stopping device of a known type, not shown. This stopping device promotes the counter-clockwise rotation of the lever 57 which releases the pin 56 from the terminal notch thereof. The rocking lever 57 is rotated in a counter-clockwise direction about 54 until the coupling pinion 48 comes into gear with the pinion 47. The cams 51 and 71 begin then to rotate in the direction of the arrows f¹ and f² respectively.

2. The pin 126 which was positioned during the playing of the record 6 at the point A of the cam path 129, follows the rising ramp 129². The support of the tone arm is moved in a clockwise direction about the horizontal shaft 21 thus tensioning the spring 158 and lifting the pick-up above the record 6. When the pin 126 reaches to the point B of the ramp 129², the pick-up is situated in a middle position, where none of the needles 8 and 24 contacts any record.

Meanwhile the pin 184 of the lever 185 has rotated the star wheel 182 one step, thus swinging the switch 132 in a counter-clockwise direction: the switch 132 closes the inlet of the path 129 and opens the way into the path 128. During the playing of the upper side of the record 6 supported on the turntable, the switch 132 was closing the path 128 and opening the inlet of the path 129.

From the point B, the pin 126 follows the first portion 127¹ of the cam path 127 thus causing the arm 134 to rotate in a clockwise direction about 135. The pin 166 of the lever 164, which at the end of the record 6 was in the position 166' shown in dotted lines in Fig. 8, is drawn in a counter-clockwise direction by the edge 165¹ of the aperture 165. The lever 164 swings the tone arm in a counter-clockwise direction about the vertical axis 150—151 thus bringing the pick-up out of the periphery of the largest record when the pin 126 reaches to the cusp C of the path 127 which is diametrically opposite the point A with respect to the shaft 50 of the cam 51.

3. Meanwhile, the cam 71 which controls the record size detection and the record feeding has been rotated one fourth of a revolution. The peripheric projection 122 has thrown back the part 121 of the lever 118, thus bringing the end 118' of this lever into its extreme left hand position. During the same fourth of a revolution of the cam 71, the path 83 of this cam promotes the necessary movements for the record size detection through the medium of roller 105, bell crank 107, levers 99 and 100 and roller 102. The lever 118 is brought into the position corresponding to the size of the lowermost record 12¹ of the reserve stack.

4. As the cam 51 further rotates, the pin 126 follows the second portion 127² of path 127, thus causing the lever 134 and link 163 to rotate about 135 in a counter-clockwise direction. The edge 165² of the aperture 165 throws back the pin 166 until the arm 125 dependent upon the link 163 comes into contact with either the step 123 or 124 of the lever 118. The upper needle 24 of the pick-up is then positioned under the outer groove of the record 12¹ whatever the size of this record may be.

5. The pin 126, after having reached to the point D where lies the switch 132, follows the rising ramp 128¹ of the path 128, the inlet of which has been opened by the switch. The lever 134 draws forth the lever 136 about the horizontal shaft 21 in a clockwise direction. This rotation brings about the lifting of the tone arm which rests on the leaf spring 158. The upper needle 24 enters the outer groove of the record 12¹; the contour of the ramp 128¹ is so conformed that after the needle 24 has entered the groove of the record 12¹, the support of the tone arm is given a small increment of rotation about the horizontal shaft 21, so that the leaf spring 158 puts on the tone arm an upward pressure sufficient to secure the correct working of the pick-up.

6. At the end of the rising ramp 128¹ the cam 51 has accomplished one full revolution. The rocking lever 53 has been rotated in a clockwise direction about the stud 54 thus putting the coupling pinion 48 out of gear from the pinion 47 and stopping the cam 51 together with the whole mechanism of the record changer. Meanwhile both the motors rotate further and the pick-up plays the lower side of the record 12¹ supported on the supporting surface 13 of the shaft 11.

7. The eccentric terminal groove of the record 12¹ actuates the automatic stopping device; the coupling of the record changing mechanism is brought about as above described and the cams 51 and 71 begin once more to rotate.

The pin 126 which was stopped at the point E follows now the descending ramp 128² of the cam path 128 thus causing the levers 134 and 136 to rotate in a counter-clockwise direction about the horizontal shaft 21. At the foot of the ramp 128² the pin 126 has reached again the point B and the pick-up has been restored to its middle position between the records 12¹ and 6.

On its way, during this latter fourth of a revolution of the cam 51, the pin 184 of the lever 185 has moved the star wheel 182 one step. The switch 132 has been swung in a clockwise direction thus closing the cam path 128 which has just been passed through by the pin 126 and opening the cam path 129.

From the point B, the pin 126 follows once more the first portion 127¹ of the plane cam path 127 thus causing the arm 134 to rotate in a clockwise direction about 135. The pin 166 is drawn back in a counter-clockwise direction by the edge 165¹ of the aperture 165. The lever 164 causes the tone arm to rotate in a counter-clockwise direction about the vertical axis 150—151 and the pick-up is brought out of the periphery of the records.

8. Meanwhile, the cam 71 has been rotated another fourth of a revolution. Its path 82 co-operating with the roller 84 causes the lever 86 to rotate in a counter-clockwise direction thus lifting the rod 93 and lowering the inner end of the bell crank 46 which presses on the head 45 of the plunger 44; this plunger actuates the rod 26 which is lowered within the shaft 11 and actuates the piece 31, the nose 31ª of which releases the record 12¹ from the supporting surface 13. The record 12¹, the lower side of which has just been played, drops by gravity along the shaft 11 onto the record 6 which rests on the turntable 5.

9. As the cams 51 and 71 continue to rotate, the pin 126 follows the second portion 127² of the plane cam path 127 whereby the tone arm is brought back inwardly over the outer groove of the upper face of the record 12¹ resting now on the turntable. The lever 118 for the record size detection remains in the position occupied at the end of the cycle part designated (3). The lower needle 8 of the pick-up is thus positioned exactly over the outer groove of the upper face of the record 12¹.

10. The pin 126 follows then the descending ramp 129¹ of the cam path 129 and comes back to the point A which it occupied at the beginning of the cycle described. This latter displacement causes the levers 134 and 136 to rotate in a counter-clockwise direction about the horizontal shaft 21 thus lowering the pick-up to permit the lower needle 8 to enter the outer groove of the upper side of the record 12¹ resting now on the record 6.

The mechanism of the record changer is then automatically disengaged and the pick-up plays the upper side of the record 12¹.

The cycle which has just been described comprised all of the necessary movements to play successively both the sides of the record 12¹ substantially without interruption and without turning this record over. The cam 51 has accomplished two full revolutions and the cam 71 one full revolution during which its path 83 has acted one time for effecting the detection of the size of the record 12¹ and the path 82 has acted one time for dropping this record 12¹ onto the turntable.

Concerning the record size detection mechanism, it is to be pointed out that the position of the lever 118 which determines the starting position of the pick-up for playing either a 30 cm. or a 25 cm. record is independent from the absolute level of the edge of the record 12¹ when the latter rests on the supporting surface 13 of the shaft 11. The detection may thus be correctly brought about even if the edge of the record 12¹ oscillates vertically while rotating or if it is not exactly round.

(b) *Playing cycle with repetition*

*First case.—Repetition of the upper side of the record 6 supported on the turntable 5.*—The cycle is at the point designated (1). The pin 126 follows the rising ramp 129² of the cam path 129. The repeating lever (192—185—187) is brought into the position shown in dotted lines in Fig. 10, in which position the pin 184 lies out of the way of the star wheel 182. This star wheel being no more actuated by the pin 184, the switch 132 remains in the same position, closing the path 128 and taking open the path 129 which has been just passed through by the pin 126. Furthermore, the extremity 194 of the lever 188 comes to bear against the coupling lever 75 thus causing the latter to rotate in a counter-clockwise direction about 76. The bent lug 79 of this lever 75 is disengaged from the notch 80 of the coupling sleeve 73. This sleeve is no more driven and the cam 71 is stopped. The record size detection does not take place; the lever 118 holds its position and the pick-up is once more lowered onto the upper side of the record 6 supported on the turntable. If the lever 192 is maintained in its position 192′, the same series of operations will take place once more, but it will be the extremity 187 of the lever (192—185—187) that will now engage the coupling lever 75 for disengaging the cam 71.

If however the lever (192—185—187) is brought back to its first position shown in full lines in Fig. 10, the coupling lever 75 will engage the sleeve 73 and the cycle will proceed normally with the detection of the size of the record 12¹, the playing of the lower side of this record, the dropping of said record onto the turntable, etc.

*Second case.—Repetition of the lower face of the record 12¹ supported on the surface 13 of the shaft 11.*—The cycle is at the point where the pin 126 follows the descending ramp 128² of the cam path 128. The lever (192—185—187) is brought into the dotted line position (192′—185′—187′) of Fig. 10. The pin 184 no more actuates the star wheel 18; the switch 132 remains in the same position, closing the path 129 and taking open the path 128. The extremity 187 of the lever (192—185—187) actuates the coupling lever 75, thus stopping the cam 71 before the path 82 actuates the levers and rods of the record feeding; the record 12¹ remains in its position on the supporting surface 13 and the pick-up comes once more to play the lower side thereof.

What we claim is:

1. In a talking machine with automatic record changer of the character described, in combination a turntable, means for rotating said turntable in one direction, a central straight and hollow shaft having means to support a stack of records above and in general vertical alignment with said turntable, means for rotating said shaft in opposite direction to said turntable, said record supporting means comprising a longitudinal piece hinged within said hollow shaft and having its upper end spring urged out of said shaft, and constituting said record supporting means, said longitudinal piece being collapsible into said shaft under the action of one or more records displaced manually from the turntable for reloading the changer, means for releasing the lowermost record of the stack from said supporting means to cause said record to drop by gravity onto said turntable, said releasing means comprising a plunger slidingly mounted in the upper part of said shaft and having a lever hinged thereto, said lever having a nose adapted to laterally displace said lowermost record upon downward displacement of said plunger, a spring normally urging said plunger upwardly thus maintaining said lever in inoperative position, and cam and lever means for automatically actuating said plunger.

2. In a talking machine with automatic record changer of the character described, in combination a single tone arm provided with stylus means for successively playing the underside of the lowermost of a stack supported on first supporting means and the upper side of the same record after it has been brought without reversal onto second supporting means positioned in general vertical alignment with said first supporting means, a rotary cam adapted to perform one complete revolution for each record side to be played, cam follower and lever means controlled by said rotary cam to bring said stylus means in position for playing either the underside or the upperside of said record, said cam comprising a first cam path controlling in one revolution the inward and outward movements of said tone arm for playing either side of said record, a second cam path separated on a part of its course in two distinct path portions, one of them controlling the rising and lowering movements of the tone arm for playing the underside of said record and the other controlling the lowering and rising movements of the tone arm for playing the upper side of said record, the single portion of said second cam path determining the intermediate displacement and rest level of said tone arm, and switch means to guide said cam follower cooperating with said second cam path into one of said distinct path portions during one revolution and into the other distinct path portion during the next revolution of said cam.

3. A rotary cam construction for controlling by cam follower and lever means the movements of the single tone arm of a record changer of the character described to play successively the underside of the lowermost record of a stack supported on first supporting means and the upper side of the same record after it has been brought without reversal onto second supporting means positioned in general vertical alignment with said first supporting means, comprising a first cam path for controlling in one revolution of said cam the inward and outward movements of the tone arm for the play of either side of said record, a second cam path separated for a part of its course in two distinct path portions, one of them for controlling the rising and lowering movements of the tone arm to play the underside and the other for controlling the lowering and rising movements of the tone arm to play the upperside of said record, the single portion of said second cam path being adapted to determine the intermediate displacement and rest level of the tone arm, and switch means adapted to guide the cam follower cooperating with said second cam path into one of said distinct path portions during one revolution and into the other distinct path portion during the next revolution of said cam.

4. In a talking machine with automatic record changer of the character described, the combination as claimed in claim 2 wherein said switch means comprise a switch member secured to a spindle pivotally supported in said cam and adapted to open and close alternately one of said distinct path portions while closing and opening alternately the other, an actuating arm for said switch member secured to said spindle, a cam disc dependent upon a star wheel pivoted on said cam and rotating said switch member through its actuating arm alternately into its two positions when the star wheel is rotated one step, and a pin on the travel of said star wheel and stationary with respect to said cam to rotate said star wheel one step at each revolution of the cam.

5. In a talking machine with automatic record changer of the character described, the combination as claimed in claim 2 wherein said switch means comprise a switch member secured to a spindle pivotally supported in said cam and adapted to open and close alternately one of said distinct cam path portions while closing and opening alternately the other, an actuating arm for said switch member secured to said spindle, a cam disc dependent upon a star wheel pivoted on said cam and rotating said switch member through its actuating arm alternately into its two positions when the star wheel is rotated one step, and a pin on the travel of said star wheel and stationary with respect to said cam for rotating said star wheel one step at each revolution of the cam, said pin being secured to an arm movable into two positions, in one of which the pin actuates the star wheel and in the other of which it does not actuate the star wheel.

6. A talking machine with automatic record changer of the character described comprising a first vertical shaft, a turntable mounted thereon, motor and gearing means for rotating said first shaft and said turntable in one direction, a hollow vertical shaft above and in vertical alignment with said first shaft, means on said hollow shaft for supporting a stack of records by the edge of their central apertures, means for rotating said hollow shaft in opposite direction to said turntable, feeding means within said hollow shaft for successively transferring the lowermost record of a stack supported on said upper supporting means onto said turntable, stylus means on a single tone arm synchronized with said feeding means for playing successively the underside of said lowermost record when supported on said upper supporting means and the upper side of said record after it has been transferred onto said turntable, first lever and cam means for controlling all of the movements of said tone arm, said first cam means comprising a single rotary control cam in disengageable gearing relation with said motor and gearing means for the first vertical shaft, second lever and cam means for controlling said record feeding means, third lever and cam means synchronized with said first and second lever and cam means for determining the initial playing position of said stylus means according to the size of said lowermost record, said second and third cam means comprising a common rotary cam in gearing relation with said first control cam and having two distinct cam paths thereon, one of said cam paths co-operating with said second lever means and the other cam path co-operating with said third lever means, and means for engaging and disengaging said common feeding and size detecting control cam with and from said tone arm control cam, whereby either side of said record may be repeated.

7. A talking machine with automatic record changer of the character described as claimed in claim 6 wherein said tone arm control cam comprises a first cam path controlling by cam follower in one revolution the inward and outward movements of the tone arm for playing either side of the records, a second cam path separated on a part of its course in two distinct path portions, one of them controlling the rising and lowering movements of the tone arm for playing the underside of the lowermost record of the stack and the other controlling the lowering and rising movements of the tone arm for playing the upper side of said record after it has been transferred onto the turntable, switch means to automatically guide said cam follower into one of said distinct cam path portions during one revolution and into the other distinct path portion during the next revolution of said cam, wherein said common feeding and size detecting control cam makes one revolution while said tone arm control cam makes two revolutions, and wherein manually operable means are provided for locking said switch means into either of its guiding positions, said manually operable means being interconnected with said means for engaging and disengaging said common feeding and size detecting cam with and from said tone arm control cam, whereby either side of any record may be repeated at will.

8. In a talking machine with automatic record changer comprising supporting means for a stack of records threaded by their central apertures on a vertical shaft and record releasing means to successively release the lowermost record of said stack from said supporting means, said means comprising an arm hinged within a longitudinal groove of said vertical shaft and having its upper end spring urged out of said shaft and constituting the record supporting means, a stop member on said shaft to limit the outer displacement of said arm, said arm being collapsible into the shaft under the action of one or more records to allow those records to be lifted along the shaft from underneath to a position above said supporting means, a record releasing lever pivotally mounted in said longitudinal groove above said supporting means and having at its lower end a nose adapted to engage the edge of the central hole of the lowermost record to push this record clear of said supporting means while the remainder of the stack is supported by the upper face of said nose, a plunger slidingly mounted in the upper part of said shaft and cam means on said record releasing lever and said plunger to transform the longitudinal displacement of the plunger into transversal displacement of the nose of the record releasing lever.

9. In a talking machine with automatic record changer comprising supporting means for a stack of records and record releasing means to successively release the lowermost record of said stack from said supporting means, a vertical shaft provided with a longitudinal groove with parallel side walls, on which shaft said records are threaded by their central apertures, a first pin secured to said vertical shaft and extending perpendicularly to said side walls, a U-shaped arm pivoted on said first pin within said groove, a wire spring acting inside the U-shaped arm to urge its upper end out of said shaft, this upper end constituting a U-shaped supporting shelf for the lowermost record of said stack, a stop member on the vertical shaft to limit the outer displacement of said U-shaped arm, said U-shaped arm being collapsible into the shaft under the action of one or more records to allow those records to be lifted along the shaft from underneath to a position above said supporting shelf, a second pin secured to the vertical shaft above said first pin and extending perpendicularly to said side walls, a record releasing lever pivoted in said longitudinal groove by its upper extremity on said second pin and having at its lower end a nose adapted to engage the edge of the central hole of the lowermost record to push this record clear of said supporting shelf while the remainder of the stack is supported by the upper face of said nose, said record releasing lever being provided with an inclined slot situated between said second pin and said nose, said vertical shaft being provided with a notch situated at the level of said nose and on the opposite side of said shaft to allow the lateral displacement of said lowermost record under the action of said nose, a plunger slidingly mounted in the upper part of said shaft, a fork secured at the lower extremity of said plunger, both arms of said fork being provided with an elongated slot, said second pin extending through said two elongated slots, a third pin secured to the fork between its two arms, this pin cooperating with said inclined slot of said record releasing lever to transform the longitudinal displacement of said plunger into transversal displacement of the nose of said record releasing lever.

10. Talking machine according to claim 9, in which said plunger is a stem coaxial with said vertical shaft, said stem being returned by a coil spring situated in an axial hole of the shaft, said spring bearing on the bottom of said hole and on a shoulder of said stem.

11. Talking machine according to claim 9, in which said record releasing lever is provided with an extension situated under said nose and intended to occupy said notch when said record releasing lever is in its rest position.

ROBERT THORENS.
LOUIS THÉVENAZ.

REFERENCES CITED

The following references are of record in the file of this patent:

UNITED STATES PATENTS

| Number | Name | Date |
| --- | --- | --- |
| 2,043,789 | Ansley | June 9, 1936 |
| 2,318,654 | Wissner | May 11, 1943 |
| 2,370,875 | Pressley | Mar. 6, 1945 |
| 2,504,596 | Scriven et al. | Apr. 18, 1950 |

FOREIGN PATENTS

| Number | Country | Date |
| --- | --- | --- |
| 822,026 | France | Sept. 6, 1937 |